United States Patent
Jahnke et al.

(12)

(10) Patent No.: US 10,897,055 B2
(45) Date of Patent: Jan. 19, 2021

(54) LOAD FOLLOWING POWER GENERATION AND POWER STORAGE USING REP AND PEM TECHNOLOGY

(71) Applicant: FuelCell Energy, Inc., Danbury, CT (US)

(72) Inventors: Fred C. Jahnke, Rye, NY (US); Matthew Lambrech, Sherman, CT (US)

(73) Assignee: FuelCell Energy, Inc., Danbury, CT (US)

( * ) Notice: Subject to any disclaimer, the term of this patent is extended or adjusted under 35 U.S.C. 154(b) by 152 days.

(21) Appl. No.: 15/815,556

(22) Filed: Nov. 16, 2017

(65) Prior Publication Data

US 2019/0148753 A1    May 16, 2019

(51) Int. Cl.
*H01M 8/0612*  (2016.01)
*H01M 8/1018*  (2016.01)
(Continued)

(52) U.S. Cl.
CPC ............ *H01M 8/0631* (2013.01); *C01B 3/34* (2013.01); *C25B 1/02* (2013.01); *C25B 1/04* (2013.01);
(Continued)

(58) Field of Classification Search
CPC ............ H01M 8/0618; H01M 8/0637; H01M 8/0625; H01M 8/0631; H01M 8/06; C01B 2203/066
See application file for complete search history.

(56) References Cited

U.S. PATENT DOCUMENTS 3,094,390 A    6/1963    Vander
3,180,813 A    4/1965    Wasp et al.
(Continued)

FOREIGN PATENT DOCUMENTS

CA    1242985 A    8/1985
CA    2937948 A    8/2015
(Continued)

OTHER PUBLICATIONS

Extended European Search Report received in EP18182124.0 dated Dec. 7, 2018 (6 pages).
(Continued)

*Primary Examiner* — Imran Akram
(74) *Attorney, Agent, or Firm* — Foley & Lardner LLP

(57) ABSTRACT

A hydrogen generation system for generating hydrogen and electrical power includes a power supply, a reformer-electrolyzer-purifier (REP) assembly including at least one fuel cell including an anode and a cathode separated by an electrolyte matrix, at least one low temperature fuel cell, and a hydrogen storage. The at least one fuel cell is configured to receive a reverse voltage supplied by the power supply and generate hydrogen-containing gas in the anode of the at least one fuel cell. The at least one low temperature fuel cell is configured to receive the hydrogen-containing gas output from the REP assembly. The at least one low temperature fuel cell is configured to selectably operate in a power generation mode in which the hydrogen-containing gas is used to generate electrical power and a power storage mode in which the hydrogen-containing gas is pressurized and stored in the hydrogen storage.

16 Claims, 9 Drawing Sheets

(51) Int. Cl.

| | | |
|---|---|---|
| *H01M 8/14* | (2006.01) | |
| *H01M 8/04082* | (2016.01) | |
| *H01M 8/04111* | (2016.01) | |
| *H01M 8/0656* | (2016.01) | |
| *H01M 8/04858* | (2016.01) | |
| *H01M 16/00* | (2006.01) | |
| *C25B 1/02* | (2006.01) | |
| *C25B 9/06* | (2006.01) | |
| *H01M 8/04029* | (2016.01) | |
| *H01M 8/0668* | (2016.01) | |
| *C01B 3/34* | (2006.01) | |
| *H01M 8/0662* | (2016.01) | |
| *C25B 15/08* | (2006.01) | |
| *C25B 1/04* | (2006.01) | |
| *H01M 8/18* | (2006.01) | |
| *H01M 8/04014* | (2016.01) | |

(52) U.S. Cl.
CPC ............ *C25B 9/06* (2013.01); *C25B 15/08* (2013.01); *H01M 8/04029* (2013.01); *H01M 8/04111* (2013.01); *H01M 8/04201* (2013.01); *H01M 8/04888* (2013.01); *H01M 8/0618* (2013.01); *H01M 8/0656* (2013.01); *H01M 8/0668* (2013.01); *H01M 8/0681* (2013.01); *H01M 8/1018* (2013.01); *H01M 8/145* (2013.01); *H01M 8/186* (2013.01); *H01M 16/003* (2013.01); *C01B 2203/066* (2013.01); *C01B 2203/067* (2013.01); *C01B 2203/1241* (2013.01); *H01M 8/04014* (2013.01); *H01M 2008/1095* (2013.01); *H01M 2008/147* (2013.01); *H01M 2300/0051* (2013.01)

(56) References Cited

U.S. PATENT DOCUMENTS

| | | |
|---|---|---|
| 4,849,091 A | 7/1989 | Cabrera et al. |
| 5,071,719 A | 12/1991 | Rostrup-Nielsen et al. |
| 5,346,613 A | 9/1994 | Lomas et al. |
| 5,346,778 A | 9/1994 | Ewan et al. |
| 5,413,878 A | 5/1995 | Williams et al. |
| 5,711,770 A | 1/1998 | Malina |
| 5,928,806 A | 7/1999 | Olah et al. |
| 6,187,465 B1 | 2/2001 | Galloway |
| 7,070,874 B2 | 7/2006 | Blanchet et al. |
| 7,150,927 B2 | 12/2006 | Hickey et al. |
| 7,201,979 B2 | 4/2007 | McElroy et al. |
| 7,323,270 B2 | 1/2008 | Patel et al. |
| 7,353,085 B2 | 4/2008 | Rusta-Sallehy et al. |
| 7,364,810 B2 | 4/2008 | Sridhar et al. |
| 7,396,603 B2 | 7/2008 | Farooque et al. |
| 7,422,810 B2 | 9/2008 | Venkataraman et al. |
| 7,482,078 B2 | 1/2009 | Sridhar et al. |
| 7,575,822 B2 | 8/2009 | Mitlitsky et al. |
| 7,704,618 B2 | 4/2010 | Venkataraman et al. |
| 7,781,112 B2 | 8/2010 | Sridhar et al. |
| 7,833,668 B2 | 11/2010 | Ballantine et al. |
| 7,846,599 B2 | 12/2010 | Ballantine et al. |
| 7,878,280 B2 | 2/2011 | Sridhar et al. |
| 7,887,971 B2 | 2/2011 | Hickey et al. |
| 7,901,814 B2 | 3/2011 | Venkataraman et al. |
| 8,053,136 B2 | 11/2011 | Hickey et al. |
| 8,071,241 B2 | 12/2011 | Sridhar et al. |
| 8,071,246 B2 | 12/2011 | Mitlitsky et al. |
| 8,277,992 B2 | 10/2012 | Mitlitsky et al. |
| 8,435,689 B2 | 5/2013 | Venkataraman |
| 8,663,859 B2 | 3/2014 | Mitlitsky et al. |
| 8,852,820 B2 | 10/2014 | Perry et al. |
| 9,190,693 B2 | 11/2015 | Sridhar et al. |
| 9,413,017 B2 | 8/2016 | Bandhauer et al. |
| 9,478,819 B2 | 10/2016 | Lambrech et al. |
| 9,722,273 B2 | 8/2017 | Perry et al. |
| 9,911,989 B2 | 3/2018 | McElroy et al. |
| 9,947,955 B2 | 4/2018 | Sridhar et al. |
| 10,096,840 B1 | 10/2018 | Venkataraman et al. |
| 10,361,442 B2 | 7/2019 | Perry et al. |
| 10,581,090 B2 | 3/2020 | Ballantine et al. |
| 2002/0004154 A1 | 1/2002 | Pastula et al. |
| 2004/0180249 A1 | 9/2004 | Pham et al. |
| 2004/0185313 A1 | 9/2004 | Halter |
| 2004/0202914 A1* | 10/2004 | Sridhar .............. C01B 3/34 429/411 |
| 2005/0058863 A1 | 3/2005 | Wang et al. |
| 2005/0112425 A1 | 5/2005 | Hsu |
| 2005/0123810 A1 | 6/2005 | Balan |
| 2005/0197743 A1 | 9/2005 | Rusta-Sallehy et al. |
| 2005/0271914 A1 | 12/2005 | Farooque et al. |
| 2006/0140823 A1 | 6/2006 | Katikaneni et al. |
| 2006/0248800 A1 | 11/2006 | Miglin et al. |
| 2008/0060935 A1 | 3/2008 | Hartvigsen |
| 2008/0075990 A1 | 3/2008 | Isozaki et al. |
| 2008/0155984 A1 | 7/2008 | Liu et al. |
| 2008/0314741 A1 | 12/2008 | Balestrino et al. |
| 2009/0110989 A1 | 4/2009 | Daly et al. |
| 2009/0158662 A1 | 6/2009 | Towler |
| 2009/0226775 A1 | 9/2009 | Jahnke et al. |
| 2009/0235587 A1 | 9/2009 | Hawkes et al. |
| 2010/0047641 A1* | 2/2010 | Jahnke ............ H01M 8/0612 429/415 |
| 2010/0215566 A1 | 8/2010 | Lourenco et al. |
| 2010/0266923 A1 | 10/2010 | McElroy et al. |
| 2010/0304228 A1 | 12/2010 | Majarov et al. |
| 2011/0104577 A1 | 5/2011 | Cui et al. |
| 2011/0189567 A1 | 8/2011 | Venkataraman et al. |
| 2012/0068661 A1 | 3/2012 | Fracas |
| 2013/0052548 A1 | 2/2013 | Nedergaard Clausen et al. |
| 2013/0108936 A1 | 5/2013 | McElroy et al. |
| 2013/0126038 A1 | 5/2013 | Jamal et al. |
| 2013/0177824 A1 | 7/2013 | Cui et al. |
| 2013/0251598 A1 | 9/2013 | Gil et al. |
| 2013/0260268 A1 | 10/2013 | Shapiro et al. |
| 2014/0076213 A1 | 3/2014 | Ingram et al. |
| 2014/0080076 A1 | 3/2014 | Lutz |
| 2014/0093798 A1 | 4/2014 | Snyder et al. |
| 2014/0272626 A1 | 9/2014 | Berlowitz et al. |
| 2014/0272629 A1 | 9/2014 | Berlowitz et al. |
| 2015/0280265 A1* | 10/2015 | McLarty ........... H01M 8/04014 429/411 |
| 2016/0344045 A1* | 11/2016 | Ishino ............... H01M 8/1231 |
| 2016/0351930 A1 | 12/2016 | Jahnke et al. |
| 2020/0161671 A1 | 5/2020 | Ballantine et al. |

FOREIGN PATENT DOCUMENTS

| | | |
|---|---|---|
| CN | 101427408 A | 5/2009 |
| CN | 104847424 A | 8/2015 |
| CN | 106133973 A | 11/2016 |
| DE | 10 2012 206 A1 | 10/2013 |
| EP | 1 620 906 | 2/2006 |
| EP | 1 665 441 | 6/2006 |
| EP | 2 784 187 A1 | 10/2014 |
| EP | 3 054 519 A1 | 8/2016 |
| JP | 51-008405 A | 1/1976 |
| JP | 60-235893 | 11/1985 |
| JP | 06-005301 A | 1/1991 |
| JP | 11-169661 A | 6/1999 |
| JP | 11-223475 A | 8/1999 |
| JP | 2002-319428 | 10/2002 |
| JP | 2004-099927 A | 4/2004 |
| JP | 2004-311159 A | 11/2004 |
| JP | 2007-162531 | 6/2007 |
| JP | 2007-523443 | 8/2007 |
| JP | 2008-507113 | 3/2008 |
| JP | 2009-517547 | 4/2009 |
| JP | 2010-013333 A | 1/2010 |
| JP | 2010-518559 A | 5/2010 |
| JP | 2010-129286 | 6/2010 |
| JP | 2010-212141 A | 9/2010 |
| JP | 2010-228963 | 10/2010 |
| JP | 2012-514039 | 6/2012 |
| JP | 2014-198789 | 10/2014 |

US 10,897,055 B2

Page 3

(56) References Cited

FOREIGN PATENT DOCUMENTS

| JP | 2005-293934 | A  | 10/2015 |
|----|-------------|----|---------|
| JP | 6096790     | B2 | 3/2017  |
| JP | 2017-511956 |    | 4/2017  |
| KR | 102007005713 | A | 6/2007  |
| KR | 20110114816 |    | 10/2011 |
| KR | 102016011463 | A | 10/2016 |
| WO | WO-01/04045 |    | 1/2001  |
| WO | WO-2007/015689 | A2 | 2/2007 |
| WO | WO-2009/031747 | A1 | 3/2009 |
| WO | WO-2010/021997 | A2 | 2/2010 |
| WO | WO-2013/029701 | A1 | 3/2013 |
| WO | WO-2015/116964 | A1 | 8/2015 |
| WO | WO-2015/153064 | A1 | 10/2015 |
| WO | WO-2017/087405 | A1 | 5/2017 |

OTHER PUBLICATIONS

International Search Report and Written Opinion in PCT/IB2018/058968 dated Jan. 23, 2019 (16 pages).
Notice of Allowance on U.S. Appl. No. 15/980,305 dated Feb. 14, 2019 (9 pages).
International Search Report and Written Opinion in PCT/162018/059191 dated Mar. 27, 2019 (20 pages).
Office Action in JP2018-116336 dated Mar. 26, 2019 with English translation (8 pages).
Office Action in JP2018-525557 dated May 24, 2019, with English translation (14 pages).
Caprile et al.; Carbon capture: Energy wasting technologies or the MCFCs challenge? International Journal of Hydrogen Energy; 2011;36:10269-10277.
Desideri et al.; MCFC-based $CO_2$ capture system for small scale CHP plants. International Journal of Hydrogen Energy. 2012;37:19295-19303.
Extended European Search Report in EP 15744017.3 dated Aug. 16, 2017 (12 pages).
Heidenbrecht et al., Molten carbonate fuel cell (MCFC) with internal teforming: model-based analysis of cell dynamics, Chemical Engineering Science, vol. 58, issues 3-6, 2003, pp. 1029-1036.
International Search Report and Written Opinion dated May 6, 2014 in PCT/US2015/013837 (13 pages).
International Search Report and Written Opinion dated Jul. 26, 2017 in PCT/US17/30230 (13 pages).
Kasai, $CO_2$ Electrochemical Separation by Molten Carbonate Technology, Fuel Chemistry Division Preprints, 2002, 47(1), 69-70.
Office Action issued in JP 2016-549225, dated Sep. 25, 2017, with English translation (10 pages).
Notice of Allowance on U.S. Appl. No. 15/980,356 dated Sep. 24, 2019 (8 pages).
Extended European Search Report dated Oct. 26, 2018 for EP18182210.7 (8 pages).
International Search Report and Written Opinion dated Jul. 19, 2017 for PCT/US17/28321 (16 pages).
International Search Report and Written Opinion for PCT/US16/61981 dated Jan. 19 2017 (8 pages).
International Search Report and Written Opinion in PCT/US/16/62276, dated Jan. 31, 2017 (8 pages).
International Search Report and Written Opinion in PCT/US16/62069 dated Jan. 27, 2017 (10 pages).
International Search Report and Written Opinion on PCT/US16/62083, dated Jan. 31, 2017, (8 pages).
Non-Final Office Action on U.S. Appl. No. 15/115,186 dated Dec. 31, 2018 (7 pages).
Notice of Preliminary Rejection for KR Appl. No. 10-2018-7017810 dated Nov. 12, 2018, with English translation (13 pages).
Office Action for KR 10-2018-7016036 dated Nov. 12, 2018, with English translation (13 pages).
Office Action in JP 2018-116336 dated Sep. 21, 2018 (7 pages).
Office Action in JP 2018-525361 dated Sep. 21, 2018 (6 pages).
Office Action received in JP 2018-133361 dated Dec. 10, 2018, with English translation (8 pages).
Office Action received in JP 2018-133362 dated Dec. 7, 2018, with English translation (6 pages).
Office Action received in JP 2018-525359 dated Dec. 10, 2018, no English translation available (4 pages ).
Extended European Search Report in EP16866931 dated May 2, 2019 (10 pages).
Extended European Search Report in EP16867038.8 dated Jun. 27, 2019 (8 pages).
Extended European Search Report on EP16866959.6 dated May 3, 2019 (10 pages).
Extended European Search Report received in EP16866965.3, dated Jun. 17, 2019 (7 pages).
Manuel, B. et al., Power to Gas-biomass oxycombustion hybrid system: Energy integration and potential applications, Applied Energy, Elsevier Science Publishers, GB, vol. 167, Oct. 16, 2015, pp. 221-229.
Third Office Action in JP 2018-116336 dated Dec. 20, 2019, with English translation (9 pages).
Campanari et al., "Using MCFC for high efficiency CO2 capture from natural gas combined cycles: Comparison of internal and external reforming", Applied Energy 112 (2013) 772-783).
Hu et al., "Electrochemical performance of reversible molten carbonate fuel cells", International Journal of Hydrogen Energy, vol. 39, Issue 23, Aug. 4, 2014, pp. 12323-12329.
Itou et al., "High Efficiency CO2 Separation and Concentration System by Using Molten Carbonate", Greenhouse Gas Control Technologies—6th International Conference Proceedings of the 6th International Conference on Greenhouse Gas Control Technologies Oct. 2002, Kyoto, Japan Volume, pp. 1331-1334.
Kasai et al., "High Temperature Electrochemical Separation of Carbon Dioxide Using Molten Carbonate", Denki Kagaku, 66, No. 6, 1998, p. 635-640.
Millet et al., "Chapter 2—Water Electrolysis Technologies", Renewable Hydrogen Technologies, 2013.
Moreno et al., International Status of Molten Carbonate Fuel Cell (MCFC) Technology, Jan. 2008.
Non-Final Office Action in U.S. Appl. No. 15/980,291 dated Jun. 22, 2020 (21 pages).
Wang et al., "The intensification technologies to water electrolysis for hydrogen production—A review", Renewable and Sustainable Energy Reviews 29 (2014) 573-588.
First Office Action in CN 2016800735683, dated Aug. 3, 2020, with English translation (16 pages).
Non-Final Office Action in U.S. Appl. No. 16/266,699, dated Oct. 16, 2020.

\* cited by examiner

LOAD FOLLOWING POWER GENERATION AND POWER STORAGE USING REP AND PEM TECHNOLOGY

STATEMENT OF GOVERNMENT RIGHTS

This invention was made with government support under Cooperative Agreement DE-EE0006669 awarded by the U.S. Department of Energy. The government has certain rights in this invention.

BACKGROUND

This application relates to production of hydrogen from fuel, such as natural gas, methane, ADG digester gas and others, and in particular, to using a fuel reformer-electrolyzer-purifier assembly for hydrogen production. This application further relates to applications of the fuel reformer-electrolyzer-purifier assembly and systems such as fuel cell systems incorporating the fuel reformer-electrolyzer-purifier assembly.

Hydrocarbon fuels, such as methane, propane, natural gas, coal gas, etc. are widely used in energy consumption devices as well as for production of energy. Many devices and systems utilizing hydrocarbon fuel, including fuel cells, require fuel to be reformed to produce hydrogen ($H_2$). Energy storage may be performed by generating $H_2$ from water or hydrocarbons. A reformer-electrolyzer-purifier ("REP") may be used to generate $H_2$. Examples of REPs and systems that include them are described in PCT Publication No. WO 2015/116964, which is assigned to the assignee of the present application.

Generally, in order to balance net generation of power with demand, power supply systems, such as power grids, need to store excess power during periods of high power generation from renewable generators and return it to the grid during periods of low power generation from the renewable sources which cannot be dispatched. Conventional solutions for storage of excess power have been to use batteries, low efficiency electrolyzers, compressed air energy storage, and pumped hydro-electric systems, all of which are expensive, have limited storage capacity or have high round trip energy losses. One of the problems with energy storage is that the storage equipment sits idle for most of the time when energy storage is not needed. Likewise, load following power generation generally has relatively low efficiency when the system is operated off of its optimum generating point.

A need exists for an improved system and method of handling energy storage and load following power generation.

SUMMARY OF THE INVENTION

In at least one embodiment, a hydrogen generation system for generating hydrogen and electrical power includes a power supply, a reformer-electrolyzer-purifier (REP) assembly including at least one fuel cell including an anode and a cathode separated by an electrolyte matrix, at least one low temperature fuel cell, and a hydrogen storage. The at least one fuel cell is configured to receive a reverse voltage supplied by the power supply and generate hydrogen-containing gas in the anode of the at least one fuel cell. The at least one low temperature fuel cell is configured to receive the hydrogen-containing gas output from the REP assembly. The at least one low temperature fuel cell is configured to selectably operate in a power generation mode in which the hydrogen-containing gas is used to generate electrical power and a power storage mode in which the hydrogen-containing gas is pressurized and stored in the hydrogen storage.

In one aspect, the power supply is configured to apply the reverse voltage so that the hydrogen-containing gas output from the REP assembly comprises 95% or greater hydrogen.

In one aspect, the REP assembly is configured to selectably operate in a hydrogen generation mode and a power generation mode; and the REP assembly further comprises a controller programmed to control the power supply to apply the reverse voltage to the at least one fuel cell when the REP assembly operates in the hydrogen producing mode such that the at least one fuel cell generates the hydrogen-containing gas, and control the power supply not to apply the reverse voltage to the at least one fuel cell when the REP assembly operates in the power producing mode such that the at least one fuel cell generates electrical power from fuel.

In one aspect, the power generated by the at least one fuel cell is configured to be output to the power supply.

In one aspect, during operation of the at least one low temperature fuel cell in the power generation mode, the at least one low temperature fuel cell outputs the generated electrical power to the power supply, the REP assembly, or a combination thereof.

In one aspect, the hydrogen generation system further comprises a second low temperature fuel cell. The hydrogen storage contains at least a pre-stored amount of the hydrogen-containing gas. During operation of the at least one low temperature fuel cell in the power generation mode, the second low temperature fuel cell is configured to receive the hydrogen-containing gas from the hydrogen storage and to output the generate electrical power to the power supply.

In one aspect, when the power supply applies the reverse voltage to the at least one fuel cell, carbon dioxide is separated from the hydrogen-containing gas using an electrolysis reaction in the anode of the at least one fuel cell such that the at least one fuel cell outputs the hydrogen-containing gas and separately outputs an oxidant gas comprising carbon dioxide and oxygen.

In one aspect, the hydrogen generation system further comprises one or more reformers configured to reform hydrocarbon fuel and output reformed fuel to the at least one fuel cell as a gas feed. The at least one fuel cell is further configured to perform one or more of reacting methane with water to produce hydrogen and carbon dioxide, and shifting carbon monoxide with water to produce hydrogen and carbon dioxide.

In one aspect, the at least one fuel cell of the REP assembly comprises a molten carbonate fuel cell and the at least one low temperature fuel cell comprises a proton exchange membrane fuel cell. The second low temperature fuel cell may comprise a proton exchange membrane fuel cell.

In another embodiment, a hydrogen generation system for generating hydrogen and electrical power includes a power supply, a reformer-electrolyzer-purifier (REP) assembly comprising at least one fuel cell including an anode and a cathode separated by an electrolyte matrix, a compressor, a heat exchanger, and a hydrogen storage. The at least one fuel cell configured to receive a reverse voltage supplied by the power supply and generate hydrogen-containing gas in the anode of the at least one fuel cell. The hydrogen generation system is configured to selectably operate in a power storage mode and a power generation mode. During operation of the hydrogen generation in the power storage mode, the compressor receives and compresses the hydrogen-containing gas output from the REP assembly, the heat exchanger receives the compressed hydrogen-containing gas output from the compressor, and the hydrogen storage receives the compressed hydrogen-containing gas output from the heat exchanger.

In one aspect, the hydrogen generation system further comprises a motor configured to receive power from the power supply and to drive the compressor.

In one aspect, the hydrogen generation system further comprises a hot water storage configured to receive, store, and output water having a first temperature, and a cold water storage configured to receive, store, and output water having a second temperature lower than the first temperature. During operation of the hydrogen generation system in the power storage mode, the heat exchanger outputs water to the hot water storage, and the cold water storage outputs water to an inlet of the heat exchanger.

In one aspect, the hydrogen generation system further comprises an expander. During operation of the power generation system in the power generation mode, the heat exchanger receives water from the hot water storage and the hydrogen-containing gas from the hydrogen storage and performs a heat exchange to the pressurized hydrogen-containing gas, and the expander receives the hydrogen-containing gas output from the heat exchanger and expands the hydrogen-containing gas to recover at least a portion of energy used to compress the hydrogen-containing gas for storage in the hydrogen storage.

In one aspect, the hydrogen generation system further comprises at least one low temperature fuel cell configured to receive the hydrogen-containing gas output from the expander and the hydrogen-containing gas output from the REP assembly, and to generate electrical power.

In one aspect, the electrical power generated by the at least one low temperature fuel cell is configured to be output to the power supply, the REP assembly or a combination thereof.

In another embodiment, a method of generating hydrogen and electrical power includes receiving fuel gas in a reformer-electrolyzer-purifier (REP) assembly comprising at least one fuel cell including an anode and a cathode separated by an electrolyte matrix; applying a reverse voltage to the at least one fuel cell, the reverse voltage generated by a power supply; generating hydrogen-containing gas in the anode of the at least one fuel cell; outputting the hydrogen-containing gas from the REP assembly to at least one low temperature fuel cell; operating the at least one low temperature fuel cell in a power generation mode in which the hydrogen-containing gas is used to generate electrical power; and operating the at least one low temperature fuel cell in a power storage mode in which the hydrogen-containing gas is pressurized and stored in a hydrogen storage.

One of ordinary skill in the art would appreciate that the aspects described above are not mutually exclusive and may be combined.

BRIEF DESCRIPTION OF THE DRAWINGS

The above and other features and aspects will become more apparent upon reading the following detailed description in conjunction with the accompanying drawings in which.

DETAILED DESCRIPTION

Referring to the figures in general, the embodiments described below are directed to a hydrogen generation system including a reformer-electrolyzer-purifier (REP) assembly, a first low temperature fuel cell, a second low temperature fuel cell, and a hydrogen storage. The first low temperature fuel cell and the second low temperature fuel cell are not part of the REP assembly. In addition, the first low temperature fuel cell and the second low temperature fuel cell are not contained in the same fuel cell stack. In other words, the first low temperature fuel cell and the second low temperature fuel cell are provided separately.

Figure 1:
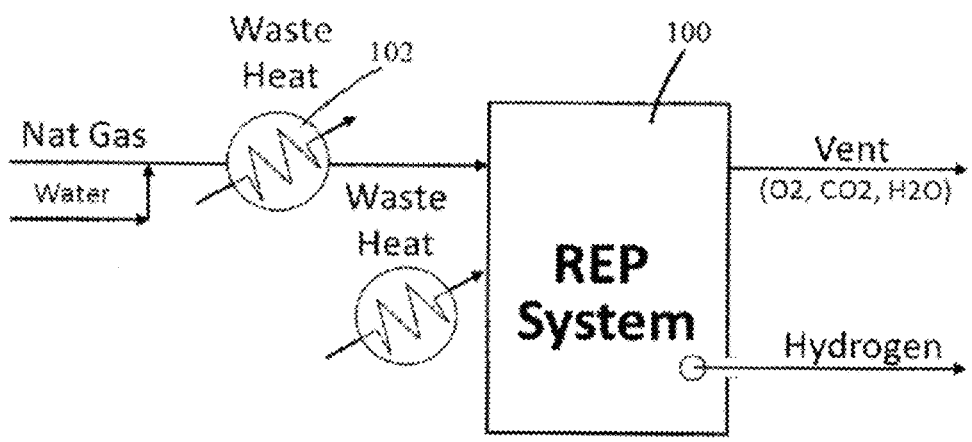
FIG. 1 shows a schematic view of the reformer-electrolyzer-purifier (REP) system including a REP assembly.

FIG. 1 shows an example of a REP assembly 100. As shown in FIG. 1, fuel, such as natural gas, ADG digester gas or other suitable fuel, is pre-heated using lower level waste heat in a pre-heater 102 and thereafter supplied to the REP assembly 100. The fuel may be humidified or mixed with water before or after being pre-heated. In the REP assembly 100, the fuel is reformed by reacting with steam to produce hydrogen, carbon monoxide, and carbon dioxide, and hydrogen is purified at high temperature (e.g., reforming temperatures) by separating $CO_2$ (as $CO_3$ ions) from other reaction products and drive the reforming reaction to completion. The REP assembly 100 outputs low purity hydrogen (approximately 95 to 98%) and separately outputs other reaction products, including oxygen, and carbon dioxide. As shown, high level waste heat is supplied to the REP assembly 100 to drive the endothermic reforming reaction so that all of the fuel is converted to hydrogen, thereby reducing $CO_2$ emissions resulting from incomplete conversion of methane to hydrogen.

Figure 2:
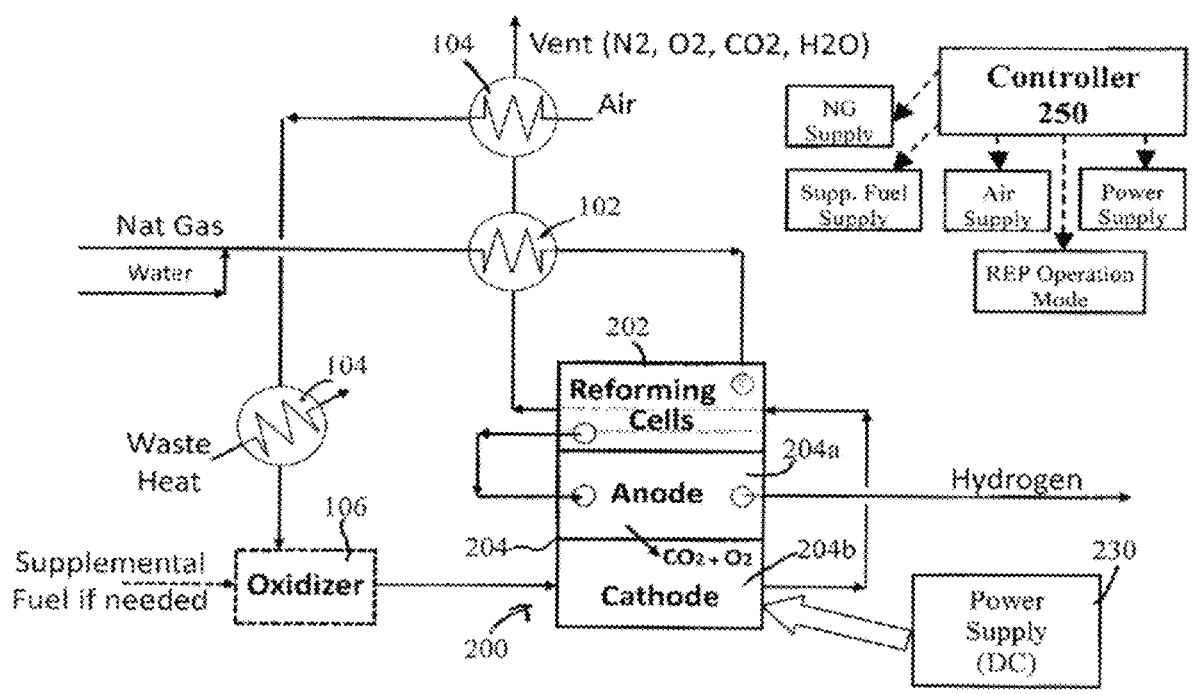
FIG. 2 shows a more detailed view of the REP system.

FIG. 2 shows a more detailed view of the REP assembly 100, which includes a REP stack 200 and a power supply 230. In the examples below, the power supply 230 is a power grid, but in other aspects, the power supply 230 may be a battery, another fuel cell or fuel cell assembly operating in a power production mode, or any other power storage or power supply device. The REP stack 200 includes one or more reforming only cells 202 and one or more REP fuel cells 204, each of which includes an anode 204a and a cathode 204b separated by an electrolyte matrix. As illustrated in FIG. 2, the reforming only cells 202 may be part of the fuel cell stack, so that the REP stack 200 is an indirect internally reforming stack. In other examples, an external reformer may be used instead of or in addition to the internal reforming only cells 202 for reforming the fuel. The REP fuel cells 204 are molten carbonate fuel cells capable of pumping $CO_2$ out of the reformed feed when operated in reverse by applying a reverse voltage supplied by the power supply 230. The reverse voltage applied may be greater than 1.0 Volt, for example, in the 1.15 to 1.5 Volt range. The reforming only cells 202 and REP fuel cells 204 are assembled in a stack and are connected in series so that fuel is first conveyed through the reforming only cells 202 and thereafter through the anodes 204a of the REP fuel cells 204. The cathodes 204b may receive hot gas, such as air, supplied to the system and a $CO_2/O_2$ gas mixture produced in purification operation from the anode 204a of the REP fuel cells 204.

As also shown in FIG. 2, the REP assembly 100 may include one or more pre-heaters which utilize waste heat from the cells 204 of the REP assembly and/or produced by other devices external to the REP assembly 100 and/or integrated with the REP assembly 100. The pre-heater 102 uses waste heat from the fuel cells 204 and reforming only cells 202 to pre-heat fuel, which is mixed with water or humidified, prior to supplying the fuel to the reforming only cells 202. Other pre-heater(s) 104 may be used for pre-heating gas supplied to the REP assembly 100 using waste heat from other devices such as a high temperature fuel cell being used to produce power. Moreover, as shown in FIG. 2, an oxidizer 106 may be provided for increasing the heat to the REP stack 200 using supplemental fuel by oxidizing the supplemental fuel with air and generating hot oxidant gas which is then supplied to the cathodes 204b.

The REP fuel cell stack 200 may be operated in purification mode, or a hydrogen producing mode, as a purifying reforming electrolyzer. During such operation, the REP assembly removes almost all of the carbon from the system as $CO_3$ ions and produces nearly pure hydrogen from the reformed methane. At the same time, the REP fuel cell stack 200 efficiently produces additional hydrogen by dissociation of steam (electrolysis). The oxygen from the electrolysis reaction with $CO_2$ to form a $CO_3$ ion Thus, when natural gas is supplied to the REP assembly, about 80% of the hydrogen output is produced from the natural gas reformation and the other 20% of the hydrogen is provided by the electrolysis reaction. The REP assembly produces hydrogen efficiently and with minimal $CO_2$ emissions.

Figure 3:
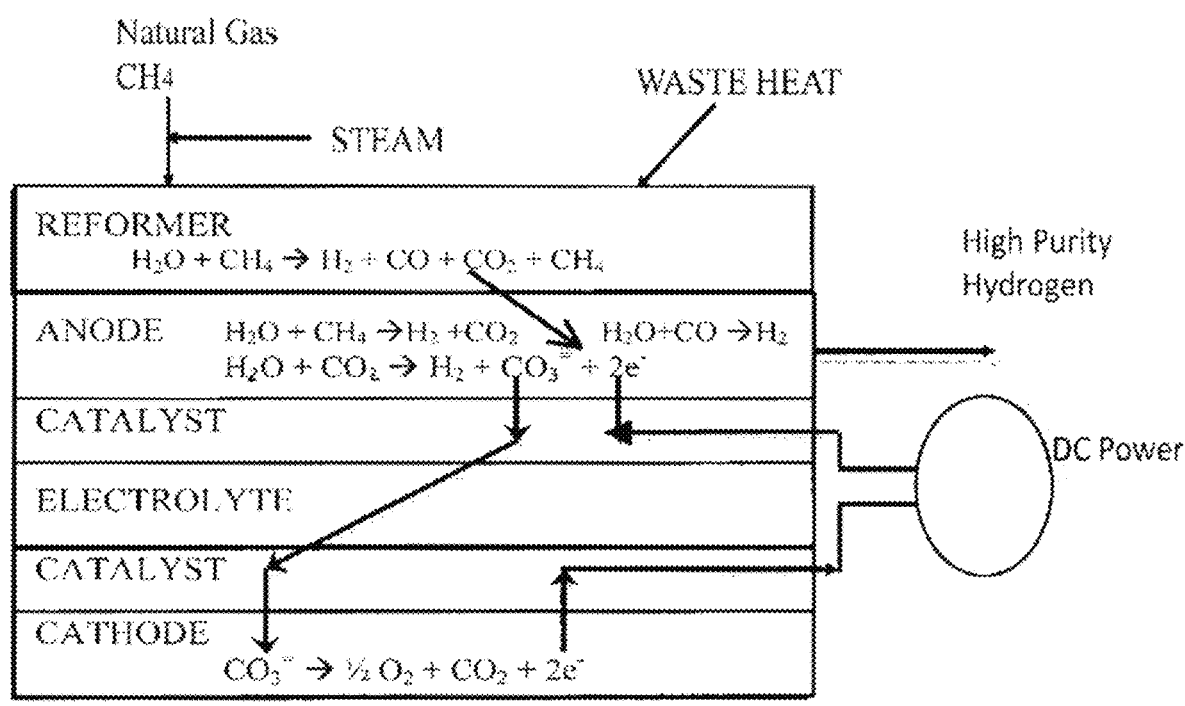
FIG. 3 shows reactions occurring in the REP assembly.

In FIG. 2, first the fuel gas is partially reformed in the reforming only cells 202. The reaction occurring between water and methane in the reforming only cells 202 is shown in FIG. 3. As shown in FIGS. 2 and 3, the partially reformed gas from the reforming only cells 202 is then fed to the anode side 204a of a fuel cell 204 operating in purification mode (hydrogen producing mode) as an electrolyzer. In the fuel cells 204, water is dissociated to hydrogen and oxygen, and the oxygen combines with the carbon dioxide in the reformed gas to produce $CO_3$ ions. The $CO_3$ ions are removed electrochemically across the molten carbonate membrane. These reactions in the anode side 204a of the fuel cell 204 are shown in FIG. 3. This operation in the fuel cell 204 removes almost all of the carbon in the system and forces the equilibrium reforming and shift reactions to essentially complete conversion of the $CH_4$ and CO to hydrogen. Thus, as shown in FIGS. 2 and 3, the exiting hydrogen-containing gas stream is almost pure hydrogen (approximately 95 to 98%) with a small amount of $CO_2$ and $CH_4$ and trace amounts of CO. This small amount of $CO_2$ and $CH_4$ can easily be removed as the hydrogen is pressurized for systems requiring high purity hydrogen. However, many systems are able to use the low purity hydrogen directly, without the need for removing the small amount of impurities. The trace $CO_2$ may be removed by methanating the CO ($CO+3H_2 \rightarrow CH_4+H_2O$) as the hydrogen is cooled down. Traces of CO will reduce the PEM fuel cell performance.

As shown in FIG. 2, the operation of the REP fuel cell 204 as an electrolyzer may be controlled by a controller 250. The controller 250 is programmed to control the supply or flow rate of reactant gases to the fuel cell 204. The controller 250 is also programmed to control the voltage and current applied to the fuel cell 204, which is supplied from the power supply 230, so that the ion transfer is in the reverse direction of the normal fuel cell operation (power generating mode). The reactions that occur in the fuel cells of the REP assembly 100 are shown in FIG. 3. The controller 250 may further control the switching of the operation modes of the fuel cell 204 between operation as an electrolyzer and normal power production operation. This operation is described in more detail below. If $CO_2$ and oxygen (66/34%) is a desired byproduct, the REP can be operated without air sweep of the cathode. When air sweep is used, the REP voltage and power requirement are reduced as the air dilutes the CO2/O2 from the REP.

FIGS. 4A-4F show illustrative configurations of hydrogen generation systems 4000, each of which includes a REP assembly 400 (e.g., the REP assembly 100 including the REP stack 200 described above) that generates hydrogen for use in one or more low temperature fuel cells 420. The low temperature fuel cells may be, for example, proton exchange membrane (PEM) power generation systems or PEM fuel cells 420. Other types of fuel cells may be used, but high temperature fuel cells do not require hydrogen and are more difficult to use for load following. The PEM power generation system or PEM fuel cell 420 can be operated both to purify compressed hydrogen and to generate power. In general, a PEM fuel cell includes a membrane electrode assembly having an anode, a cathode, and a polymer electrolyte membrane sandwiched therebetween. The membrane electrode assembly is sandwiched by a pair of flow field plates configured to channel hydrogen to the anode on one side of the fuel cell, and oxygen to the cathode on the other side of the fuel cell. The anode may include a catalyst, for example, a platinum catalyst that causes the hydrogen gas to split into protons (positively charged hydrogen ions) and electrons (negatively charged). The polymer electrolyte membrane only allows the protons to pass through it to the cathode, where, in the power production mode, the protons combine with the oxygen supplied to the cathode to form water. The electrons travel along an external circuit to the cathode (i.e., the electrons do not pass through the polymer electrolyte membrane), creating an electrical current (i.e., producing electrical energy). The PEM fuel-cell in purification mode can be used to pressurize the $H_2$ as well as purify it. In this mode, lower purity hydrogen is fed to the anode and pure hydrogen leaves the cathode.

The illustrative systems of FIGS. 4A-4F also include an external reformer 430 for partially reforming fuel, such as natural gas, with water in the form of steam, and high level heater 440, such as a burner, that generates high level heat for the reformer 430.

As shown in FIGS. 4A-4F, fuel such as natural gas and water are pre-heated in a heat exchanger 450 using low level waste heat, which can be from an outside source, so as to vaporize the water. The resulting mixture of steam and fuel is then conveyed to the reformer 430 where the fuel is partially reformed using the high level heat provided by the high level heater 440. The high level heater 440, which can be a burner, receives oxidant gas and a slipstream of fuel and burns or oxidizes the fuel to generate high level heat for the reforming reaction in the reformer 430. The partially reformed fuel output from the reformer is then fed to an anode side 412 of the REP assembly 400, which produces a hydrogen-containing gas stream with typically 95% or greater purity. The REP assembly 400 includes a MCFC fuel cell stack that is operated in reverse as an electrolyzer, and has the same or similar construction and operation as the REP stack 200 described above. The REP assembly 400 also includes a power supply (e.g., the power supply 230 described above) for applying a reverse voltage to the fuel cell stack. The REP assembly 400 also separately outputs from a cathode side 414 an oxidant gas comprising a $CO_2/O_2$ mixture produced as a result of the result of the reactions in the REP assembly 400. The reactions occurring in the REP assembly 400 are described above and shown in FIG. 3.

In the systems of FIGS. 4A-4F, hydrogen-containing gas stream generated by the REP assembly 400 is cooled and may be processed, and thereafter fed to one or more PEM power generation system 420, which includes one or more PEM fuel cells. During or after the cooling process, the partially cooled hydrogen-containing gas is contacted with a reforming catalyst (not shown) that converts all of the CO and most of the $CO_2$ in the hydrogen gas stream to methane and water, so that a mixture of 95% or more of hydrogen, 5% or less of methane plus $CO_2$, and less than 1 ppm CO is conveyed to an anode side 422 of the one or more PEM power generation systems 420. In the illustrative configurations of FIGS. 4A-4F, a blow down from the anode side 422 of the PEM fuel cell(s) is used to keep the methane concentration in the fuel cell low. Specifically, anode exhaust gas including methane and hydrogen output from the anode side 422 of the PEM fuel cell(s) is recycled back to the reforming system via an anode exhaust recycle path 426 and mixed with the fuel and water input into the system so that 100% of the fuel is utilized and the concentration of methane in the fuel gas provided to the anode side 422 of the PEM fuel cell(s) is low. A recycle blower assembly 425 is provided in the recycle path in order to provide the gas pressure needed to feed the REP system.

The configurations of FIGS. 4A-4F differ mainly in the way air is provided to the hydrogen generation system 4000, the way the $CO_2/O_2$ mixture output from the REP assembly 400 is utilized, provision of $CO_2$ capture and/or provision of hydrogen storage. The different configurations of the hydrogen generation system 4000 in FIGS. 4A-4F will now be described.

Figure 4A:
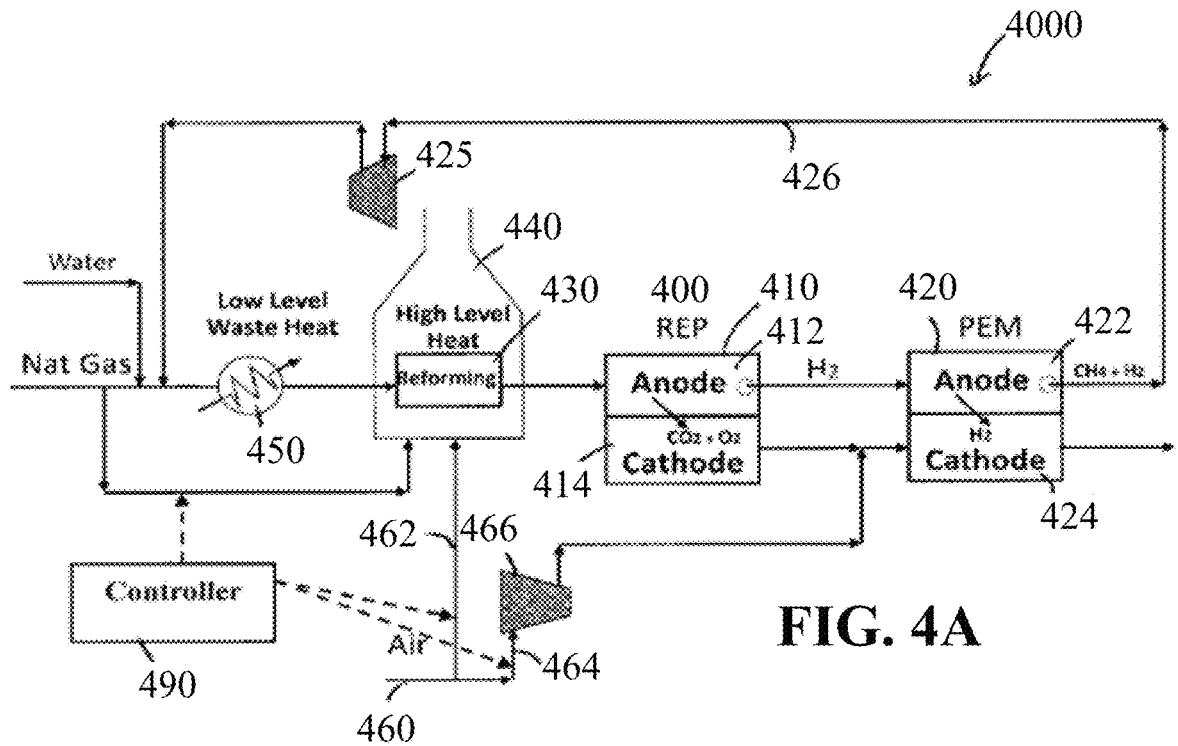
FIGS. 4A-4F show illustrative configurations of hydrogen generation systems, each of which includes the REP assembly of FIG. 1 to generate hydrogen for use in one or more proton exchange membrane (PEM) power generation systems. The configurations of FIGS. 4A-4F differ mainly in the way air is provided to the hydrogen generation system, the way the $CO_2/O_2$ mixture output from the REP assembly is utilized, provision of $CO_2$ capture and/or provision of hydrogen storage.

In FIG. 4A, air 460 supplied to the hydrogen generation system 4000 is used in the high level heater 440 and in the PEM power generation system 420. As shown, a first portion of air 462 is conveyed to the high level heater 440 for burning with the slipstream of the fuel, and a second portion of air 464 is conveyed to a cathode side 424 of the PEM power generation system 420. A blower 466, or a similar device, may be used for supplying the second air portion 464 to the cathode side 424 of the PEM power generation system 420.

As shown in FIG. 4A, no air is fed to the cathode side 414 of the REP assembly 400. Although this configuration requires more power for operating the REP assembly 400, the REP assembly 400 outputs from the cathode side 414 an oxidant gas with more than 30% oxygen, which is then conveyed to the cathode side 424 of the PEM power generation system 420 along with the second air portion. The supply of this enriched oxidant gas to the PEM power generation system 420 increases the operating performance of the PEM power generation system 420. In the illustrative configuration of FIG. 4A, cathode exhaust output from the cathode side 424 of the PEM power generation system 420 is vented out of the hydrogen generation system 4000.

Figure 4B:
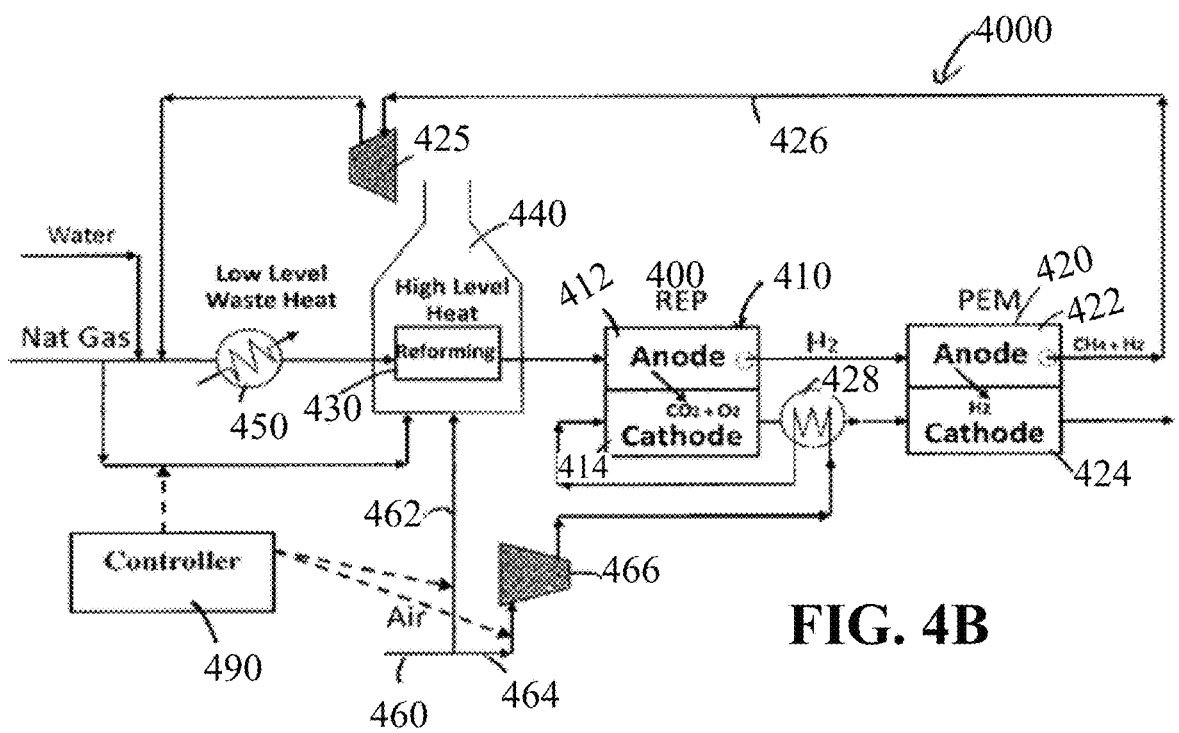

FIG. 4B shows a similar configuration to that of FIG. 4A, but the second air portion 464 is conveyed to the cathode side 414 of the REP assembly 400 instead of being provided directly to the cathode side 424 of the PEM power generation system 420. All of the components that are similar and have similar functions are labeled with like reference numbers and detailed description thereof is omitted. As shown in FIG. 4B, the second portion of air 464 is pre-heated in a heat exchanger 428 using heat in the oxidant exhaust output from the cathode side 414 of the REP assembly 400, and the pre-heated second air portion is then conveyed to the cathode side 414 of the REP assembly 400. This illustrative configuration reduces the power consumption of the REP assembly 400 due to the lower voltage required, but requires the addition of a heat exchanger.

Figure 4C:
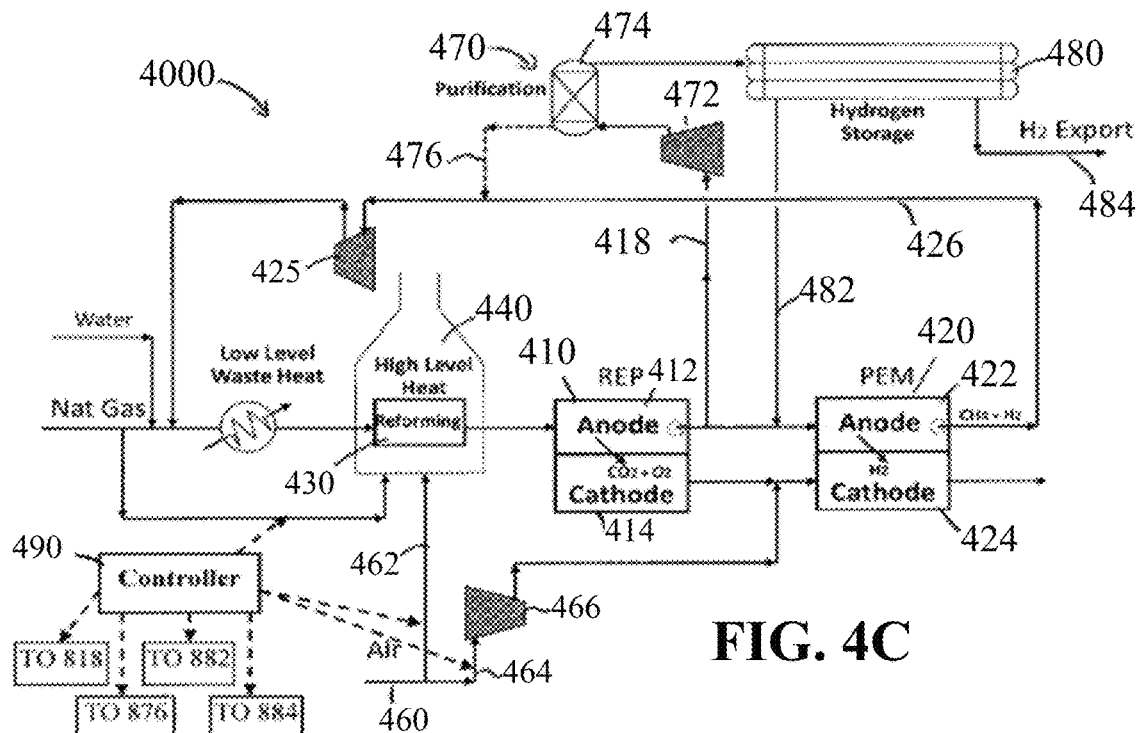

The systems of FIGS. 4A-4B can be readily configured to operate as a peaking system by adding hydrogen storage. FIG. 4C shows an illustrative configuration of the hydrogen generation system 4000 of FIG. 4A configured as a peaking system with hydrogen storage 480. Hydrogen is typically be stored at 1000 to 2000 psig, but in some examples, the hydrogen may be stored from 50 psig to 10,000 psig. All of the components that are similar and have similar functions are labeled with like reference numbers and detailed description thereof is omitted.

In FIG. 4C, an optional hydrogen generation system 4000 includes a hydrogen purification assembly 470 for purifying all or a portion of the hydrogen-containing gas generated by the REP assembly 400 after it is compressed for storage and a hydrogen storage assembly 480 for storing the purified and compressed hydrogen output from the hydrogen purification assembly 470. The hydrogen generation system 4000 of FIG. 4C allows the REP assembly 400 to be operated continuously so as to continuously generate the hydrogen-containing gas, while the PEM energy generation system 420 and the hydrogen storage assembly 480 may be operated based on external power demand. Specifically, the hydrogen-containing gas produced by the REP assembly 400 can be stored in the hydrogen storage assembly 480 or converted directly into power in the PEM energy generation system 420 depending on the external power demand for the PEM energy generation system 420. In addition, the amount of hydrogen-containing gas conveyed to the PEM energy generation system 420 and the amount of hydrogen-containing gas conveyed to the hydrogen storage assembly 480 is controlled by a controller 490 based on the operating conditions of the PEM energy generation system 420 and/or the power demands on the PEM energy generation system 420.

As shown in FIG. 4C, all or a portion of the hydrogen-containing gas output from the REP assembly 400 can be conveyed to the PEM energy generation system 420 for generating power and/or to the hydrogen storage assembly 470 where the hydrogen-containing gas is compressed using a compressor 472 and thereafter hydrogen purified in an optional purification device 474 such as a pressure swing adsorber (PSA) or an electrochemical hydrogen compressor (EHC). If an EHC is used as a compressor 472, further purification may not be required. Purification is not needed for power generation, but may be needed if the hydrogen is exported for other uses. After the hydrogen-containing gas is compressed in the compressor 472, purification in the purification device 474 is relatively easy to accomplish due to the low level of contaminants in the gas. The purified pressurized hydrogen gas output from the purification device 474 is then conveyed to the hydrogen storage assembly 480 for storage for future use in the PEM power generation assembly 420 during peak power generation and/or for output to outside devices. Although not shown in FIG. 4C, a hydrogen expander may be provided for expanding pressurized hydrogen conveyed from the hydrogen storage 480 to the PEM power generation system 420 so as to recover some of the energy used for compressing the hydrogen for storage in the storage assembly 480.

As shown in FIG. 4C, the system also includes a hydrogen bypass path 476 for conveying the impurities (mainly $CH_4$) from the purification device 474 to a PEM anode exhaust recycle path 426 which recycles the anode exhaust produced by the PEM power generation system 420 for use in the reformer 430. As discussed above, the hydrogen generation system 4000 also includes the controller 490 for controlling the operation of the hydrogen generation system 4000 and in particular, for controlling the use and routing of the hydrogen-containing gas generated by the REP assembly 400. Specifically, the controller 490 is programmed to control the amount of the hydrogen-containing gas conveyed from the REP assembly 400 to the PEM power generation system 420, the amount of the hydrogen-containing gas conveyed from the REP assembly 400 to the hydrogen purification assembly 470, the amount of purified hydrogen conveyed from the hydrogen purification assembly 470 to the hydrogen storage assembly 480, the amount of hydrogen conveyed from the hydrogen storage assembly 480 to the PEM power generation system 420 and the amount of hydrogen output from the hydrogen storage assembly 480. These controls are based on a number of factors, including the operating mode of the REP assembly and of the PEM power generation system, the external power demand on the PEM power generation system, the capacity of the hydrogen storage assembly, and the composition of the fuel feed. Thus, for example, when the external power demand is low and/or when the PEM power generation system is producing no or low power, the controller 490 controls a larger amount of the hydrogen-containing gas, or all of the hydrogen-containing gas, produced by the REP assembly to be conveyed to the hydrogen purification assembly 470 and to be stored in the hydrogen storage assembly 480. However, when the power demand is high, such as during peak power operation of the PEM power generation assembly 420, the controller 490 controls all or a larger portion of the hydrogen-containing gas generated by the REP assembly to be conveyed to the anode side 422 of the PEM power generation system 420 with little or no hydrogen-containing gas being conveyed to the hydrogen purification assembly 470. During such high power demand, the controller 490 may also control hydrogen to be conveyed from the hydrogen storage assembly 480 to the PEM power generation system 420 so as to generate additional power. Moreover, when the storage capacity of the hydrogen storage assembly 480 becomes low, the controller 490 may control hydrogen to be output from the hydrogen storage assembly 480 and/or to be provided to the PEM power generation system 420. It is further contemplated that the same controller 490 or another control device also controls the amount of air provided with the first air portion 462 to the high level heater 440 and the amount of air provided with the second air portion 464 to the cathode side 424 of the PEM power generation system 420. A similar controller may be provided in the systems shown in FIGS. 4A and 4B.

Figure 4D:
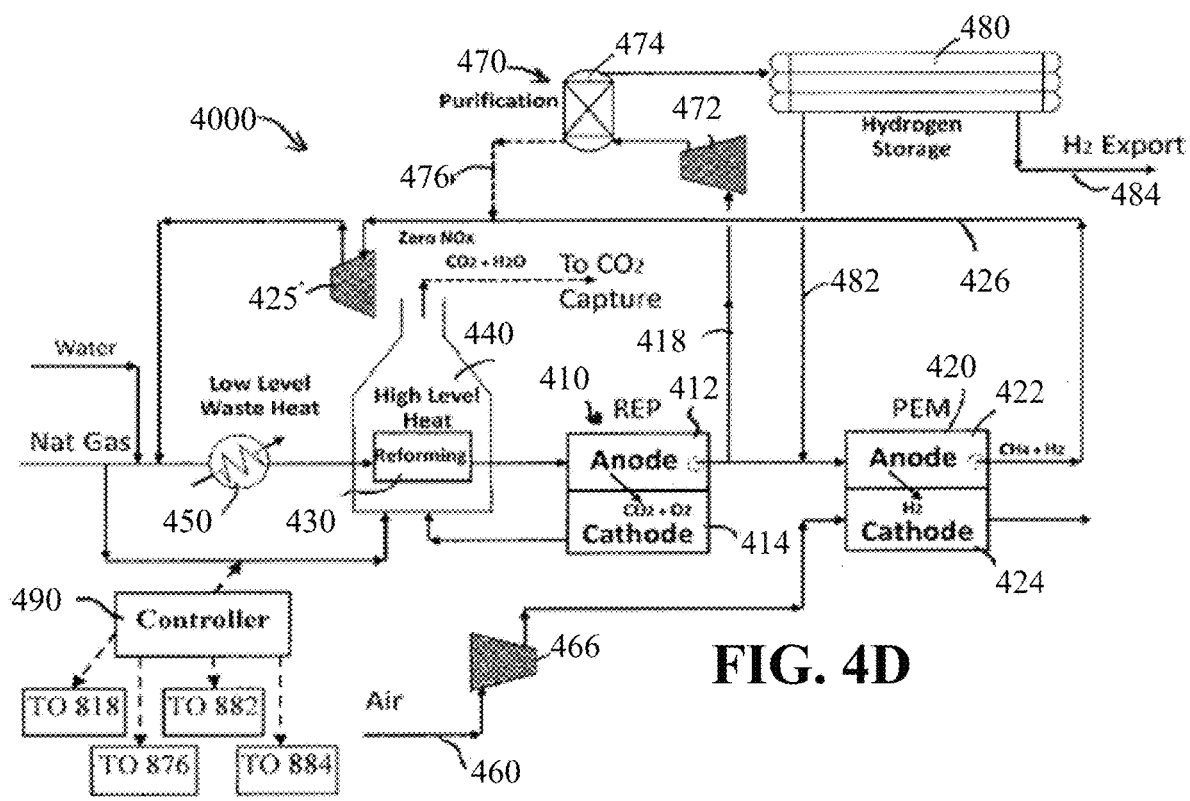

FIG. 4D shows a modified configuration of the hydrogen generation system 4000 of FIG. 4C. All of the components that are similar and have similar functions are labeled with like reference numbers and detailed description thereof is omitted. In the configuration shown in FIG. 4D, the oxidant gas comprising the $CO_2/O_2$ mixture output from the REP assembly 400 is used to oxidize fuel needed to generate the high level heat in the heater 440 for the reforming reaction in the reformer 430. In the hydrogen generation system 4000 of FIG. 4D, all of the air 460 is conveyed to the cathode side 424 of the PEM power generation system 420 via a blower 466 or the like, and the REP assembly 400 is not supplied with air. As shown, the cathode side 414 of the REP assembly 400 outputs the oxidant gas comprising the $CO_2/O_2$ mixture to the high level heater 440 where it is used to oxidize the slipstream of fuel and to generate high level heat for the reformer 430. The high level heater 440 outputs a flue gas exhaust which comprises mainly $CO_2$ and water with a small amount of unreacted oxygen and which can be processed for $CO_2$ capture. Specifically, the flue gas exhaust from the heater 440 is cooled so as to condense the water out and the resulting gas is almost pure $CO_2$ which can be easily captured for storage or other uses. One of the advantages of the hydrogen generation system 4000 in FIG. 4D is that no NOx is produced by the high level heater 440 because no nitrogen is present in the input $CO_2/O_2$ mixture and in the oxidation reaction. Therefore, this system can be easily installed even in environmentally sensitive areas with or without $CO_2$ capture. Another advantage of the system in FIG. 4D is easy capture of CO2 from the heater exhaust, as described above.

Figure 4E:
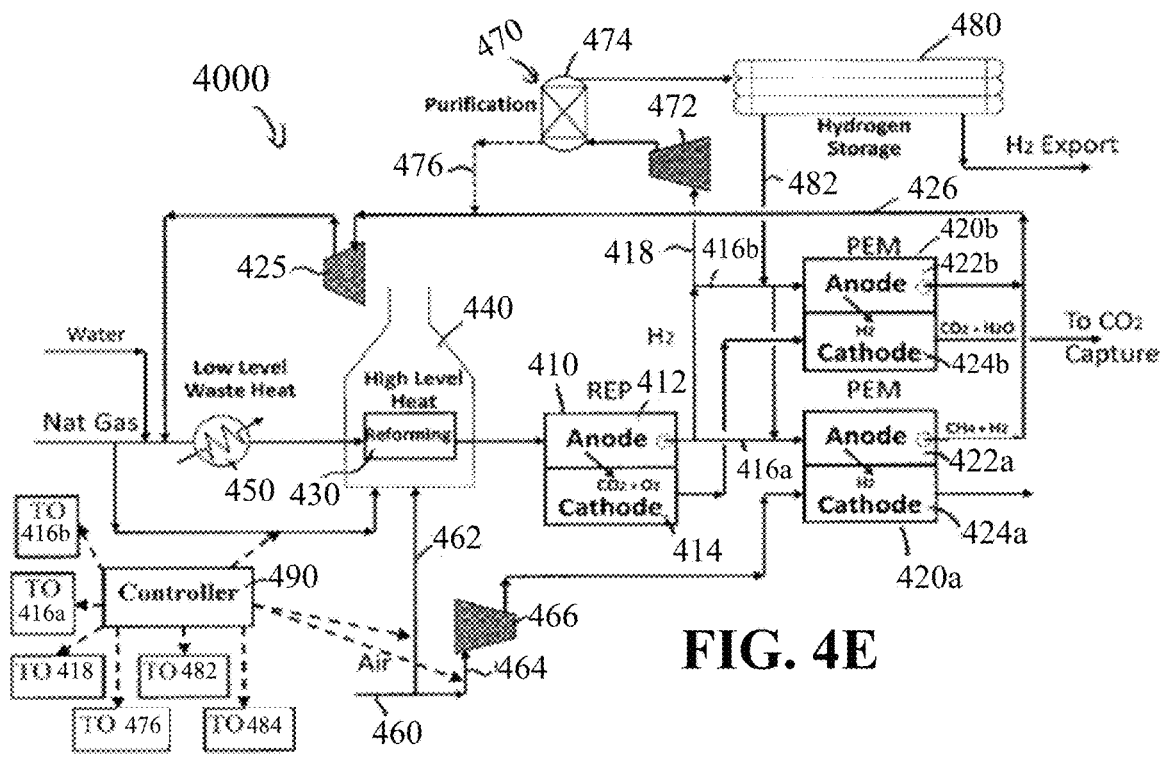

FIG. 4E shows a modified configuration of the hydrogen generation system 4000 shown in FIG. 4D and includes two PEM fuel cells 420a and 420b, wherein a first PEM fuel cell 420a is used for power generation and a second PEM fuel cell 420b is added for oxidizing and removing oxygen from the $CO_2/O_2$ mixture produced by the REP assembly 400 to facilitate $CO_2$ capture while generating additional power. All of the components that are similar and have similar functions are labeled with like reference numbers and detailed description thereof is omitted.

As shown in FIG. 4E, air 460 supplied to the system, with the first portion 462 of the air being provided to the high level heater 440 and the second portion 464 of the air being provided to a cathode side 424a of the first PEM fuel cell 420a using a blower 466 or similar device. In the illustrative embodiment of FIG. 4E, no air is provided to the cathode side 414 of the REP assembly 400. The amount of the first air portion 462 and the amount of the second air portion 464 is controlled by a controller, which can be the controller 490 or a separate control device.

In FIG. 4E, a first portion 416a of the hydrogen-containing gas output from the anode side 412 of the REP assembly 400 is conveyed to an anode side 422a of the first PEM fuel cell 420a and a second portion 416b of the hydrogen-containing gas output from the anode side 412 of the REP assembly 400 is conveyed to an anode side 422b of the second PEM fuel cell 420b. Moreover, a third portion 418 of the hydrogen-containing gas, which may include all or some of the hydrogen-containing gas output from the REP assembly 400, can be conveyed to the hydrogen purification assembly 470 for storage in the hydrogen storage assembly 480 and/or recycling via the bypass path 476. The amount of the hydrogen-containing gas conveyed from the REP assembly 400 to the first and second PEM fuel cells 420a, 420b and/or to the hydrogen purification assembly 470 is controlled by the controller 490 based on external power demands on the PEM fuel cells 420a, 420b, the amount of $CO_2/O_2$ mixture produced by the REP assembly 400, the storage capacity of the hydrogen storage assembly 480 and other factors. The amount of purified and pressurized hydrogen conveyed from the purification assembly 470 to the hydrogen storage assembly 480 and/or to the hydrogen bypass path 476 is also controlled by the controller 490.

As shown in FIG. 4E, the $CO_2/O_2$ mixture output from the cathode side 414 of the REP assembly 400 is conveyed to a cathode side 424b of the second PEM fuel cell 420b where it is electrochemically reacted with the hydrogen gas provided to the anode size 422b. The cathode side 424b of the second PEM fuel cell assembly outputs a cathode exhaust comprising mostly $CO_2$ and water with a small amount of residual oxygen. This cathode exhaust can be cooled to condense out the water and thereafter provided for $CO_2$ capture for storage or other uses. Use of the second PEM fuel cell 420b to receive and react the $CO_2/O_2$ mixture produced by the REP assembly 400 results in a lower concentration of oxygen in the cathode exhaust without producing any CO. As a result the $CO_2$ capture from the cathode exhaust of the second PEM fuel cell 420b is simplified. Although not illustrated, in other aspects, the hydrogen purification assembly 470 may be omitted such that the hydrogen-containing gas output from the REP assembly 400 is directly conveyed to the first PEM fuel cell 420a and/or the second PEM fuel cell 420b, and the hydrogen-containing gas output from the first PEM fuel cell 420a and/or the second PEM fuel cell 420b is conveyed to the hydrogen storage 480 and/or recycled back to the reforming system via the anode exhaust recycle path 426.

Figure 4F:
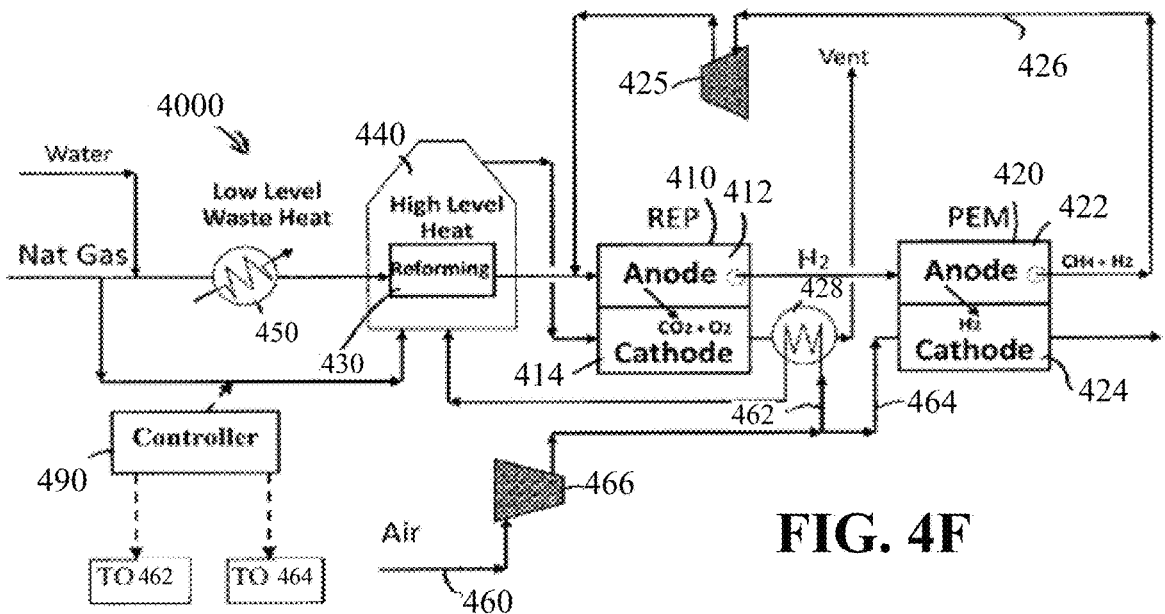

FIG. 4F shows an additional potential configuration of a system 4000. All of the components that are similar and have similar functions are labeled with like reference numbers and detailed description thereof is omitted. In FIG. 4F, air 460 is supplied to the system using a blower 466 or a similar device. A first portion of the air 462 is pre-heated in a heat exchanger 428 using heat from the air/CO2/O2 mixture output from the cathode side 414 of the REP assembly 400 before being conveyed to the high level heater 440. A second portion of the air 464 is provided to the cathode side 424 of the PEM power generation system 420. In the system of FIG. 4F, flue gas produced by the oxidizing reaction in the heater 440 is output from the heater and conveyed to the cathode side 414 of the REP assembly 400. This flue gas is heated to the REP operating temperature and by sweeping the REP cathode with flue gas, the REP voltage and required power input will be reduced. The $CO_2/O_2$ mixture produced by the REP assembly 400 is mixed with the flue gas and output from the cathode side 414 of the REP assembly, conveyed through the heat exchanger 428 and output from the system.

As also shown in FIG. 4F, hydrogen-containing gas produced by the REP assembly 400 is output from its anode side 412 and conveyed to the anode side 422 of the PEM power generation system 420. Anode exhaust output from the anode side 422 of the PEM system 420 and comprising hydrogen and methane is recycled to the anode side 412 of the REP assembly 400. A recycle blower assembly 425 including a blower may be used in the anode exhaust recycle path 426 in order to provide the pressure needed to recycle the PEM anode exhaust. The recycle blower assembly 425 also keeps the methane concentration in the PEM fuel cell low by converting the recycled methane to hydrogen in the REP. A small blowdown of the recycle stream to the reformer fuel (not shown) can be used to prevent the buildup of inerts (such as $N_2$) in the REP hydrogen. Sweeping the cathode side of the REP assembly 400 with the exhaust gas from the reformer 440 will reduce the voltage and power required by the REP assembly. The REP assembly 400 is also expected to reduce the NOx in the reformer 440 exhaust.

The modes of operation of the various examples of the hydrogen generation system 4000 described above will now be discussed in detail. For simplicity, the REP assembly and the PEM power generation systems are illustrated schematically, but it is understood that any of the REP assemblies or PEM power generation systems (or PEM fuel cells) described above may be used. Any of the hydrogen generation systems described in this application can be operated in a power storage mode in which hydrogen output from the REP assembly is ultimately stored in a hydrogen storage and a peak power mode in which hydrogen from the hydrogen storage is used to generate power, as described below.

Power Storage Modes

Mode 1A—Power Storage Mode for Load Following Power Generation Using a Reversible EHC Load following power generation is needed to match an amount of power generated for the grid with a demand for power from the grid. This is becoming more important as renewable power generation increases, since the power generation cannot be controlled. Currently, low efficiency load following power generation is used. However in the future, power storage, as well as power generation, will be needed to match the power to the grid with the power demand.

Figure 5:
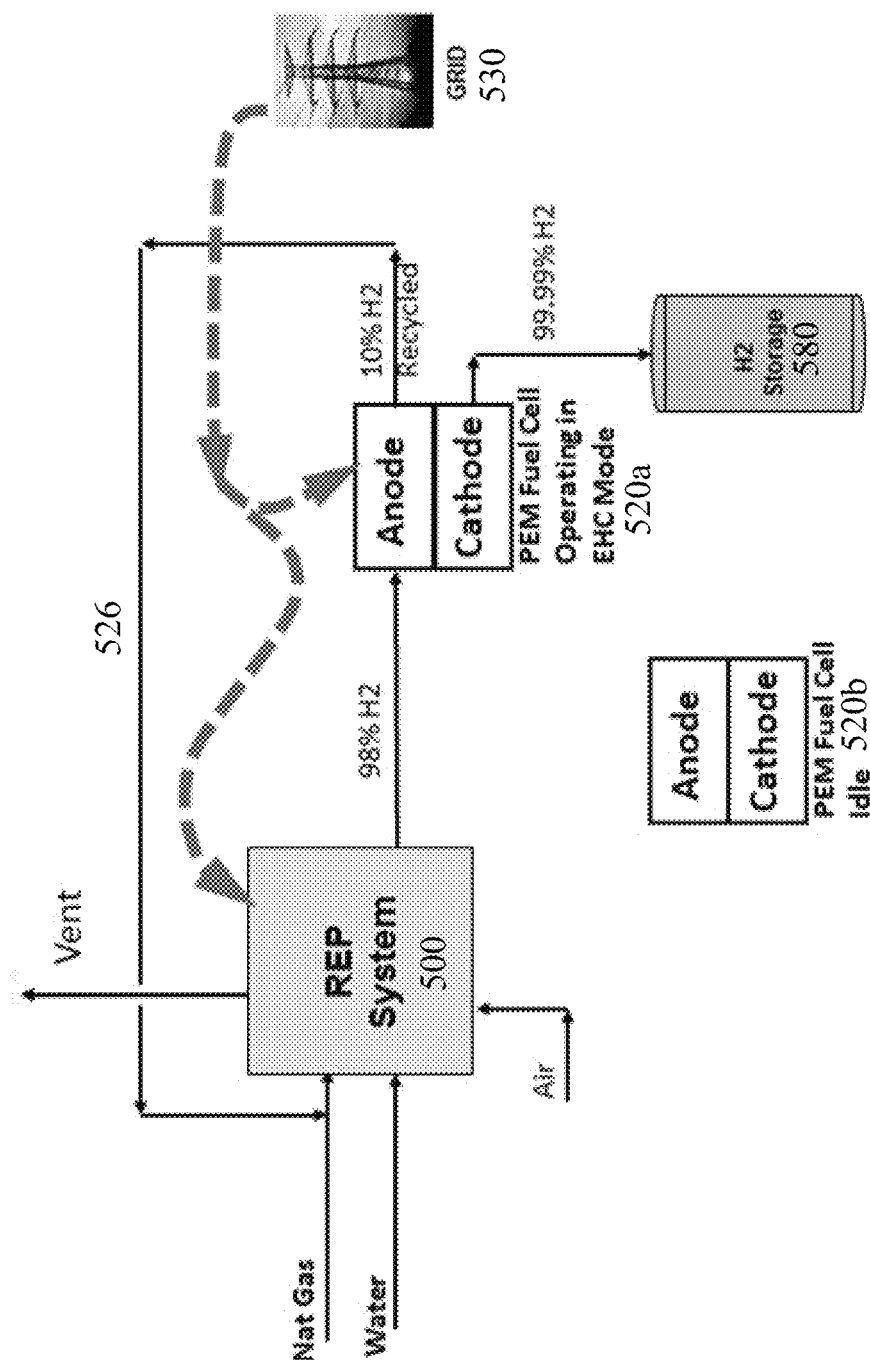
FIG. 5 illustrates operation of a hydrogen generation system in Mode 1A—a power storage mode for load following power generation.

FIG. 5 illustrates operation of the hydrogen generation system in Mode 1A—a power storage mode for load following power generation. In Mode 1A, excess power from a power grid 530 (or any other power source, for example, the power supply 230 described above) is used to operate the REP assembly 500 and a first PEM system or PEM fuel cell 520a operating in EHC mode. Natural gas and water and power are fed into the REP assembly 500, which generates hydrogen (approximately 95 to 98% purity) and feeds the hydrogen to the first PEM system or PEM fuel cell 520a operating in EHC mode. The first PEM system or PEM fuel cell 520a is operated in reverse as an electrochemical hydrogen purifier and compressor, and outputs compressed, purified hydrogen to a hydrogen storage 580 (e.g., the hydrogen storage 480 described above) and an anode exhaust recycle path 526 (e.g., the anode exhaust recycle path 426 described above). The recycle sends unconverted methane back to the REP for conversion to hydrogen. The first PEM power generation system or PEM fuel cell 520a is operating in an electrochemical hydrogen compression (EHC) mode in that the first PEM power generation system or PEM fuel cell 520a pressurizes hydrogen gas for storage. In this example, the first PEM power generation system or PEM fuel cell 520a is reversible and can be operated to generate power when needed. Hydrogen in the hydrogen storage 580 may be used, for example, when peak power is needed. A second PEM power generation system or PEM fuel cell 520b is idle during Mode 1A operation.

Mode 1B—Power Storage Mode for Load Following Power Using a Compressor (also with $CO_2/O_2$ Generation)

Figure 6:
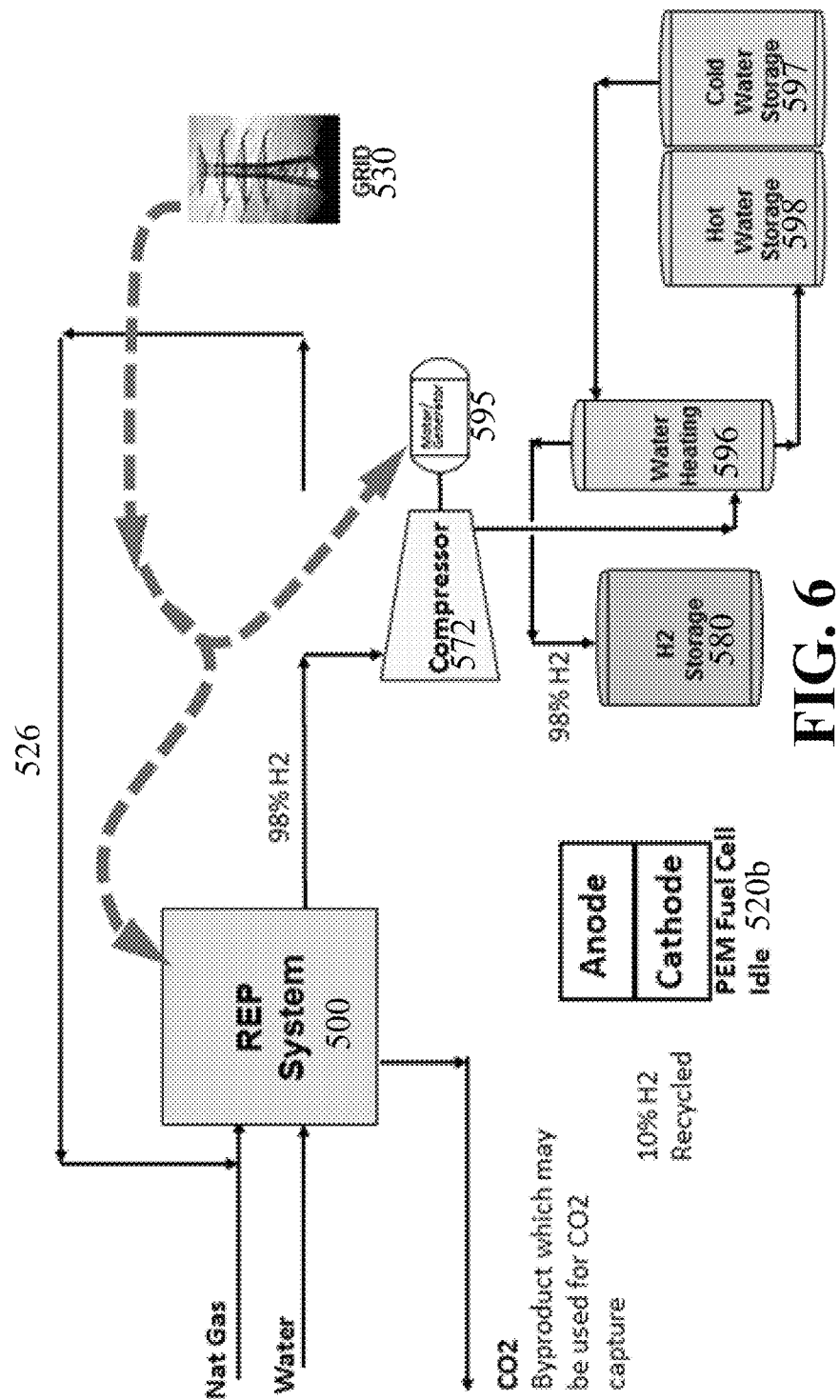
FIG. 6 illustrates operation of the hydrogen generation system in Mode 1B—a power storage mode for load following power using a compressor (and with $CO_2/O_2$ cogeneration).

FIG. 6 illustrates operation of the hydrogen generation system in Mode 1B—a power storage mode for load following power and $CO_2/O_2$ generation. In Mode 1B, power from a power grid 530 (or any other power source, for example, the power supply 230 described above) is used to operate the REP assembly 500 and a motor/generator 595 configured to drive a compressor/expander 571. This case is similar to Mode 1A with the EHC, but this example uses a mechanical compressor and does not purify the stored hydrogen. Natural gas and water and power are fed into the REP assembly 500, which generates hydrogen (approximately 95 to 98% purity) and feeds the hydrogen to the compressor 572 that compresses the hydrogen and outputs the hydrogen to a heat exchanger 596. Because the compressor heats up the hydrogen, it is more efficient to cool the hydrogen before sending it to storage. In this example, the hydrogen heats cold water in the heat exchanger 596 (supplied by a cold water storage 597), for example, to a predetermined temperature, and the heated water is output and stored in a hot water storage 598. This allows the system to recover the heat generated by the compression system. The hot water may be used in the peak power mode to preheat and humidify the hydrogen going to the expander which increases the expander power output. The hydrogen is output from the heat exchanger 596 and stored in the hydrogen storage 580 for later use. The second PEM power generation system or PEM fuel cell 520*b* is idle during Mode 1B operation. The oxidant gas comprising the $CO_2/O_2$ mixture output from the REP assembly 500 is used for $CO_2$ capture and/or $O_2$ output. Use of a compressor rather than in EHC would be more cost-effective for larger systems.

Peak Power Modes

Figure 7:
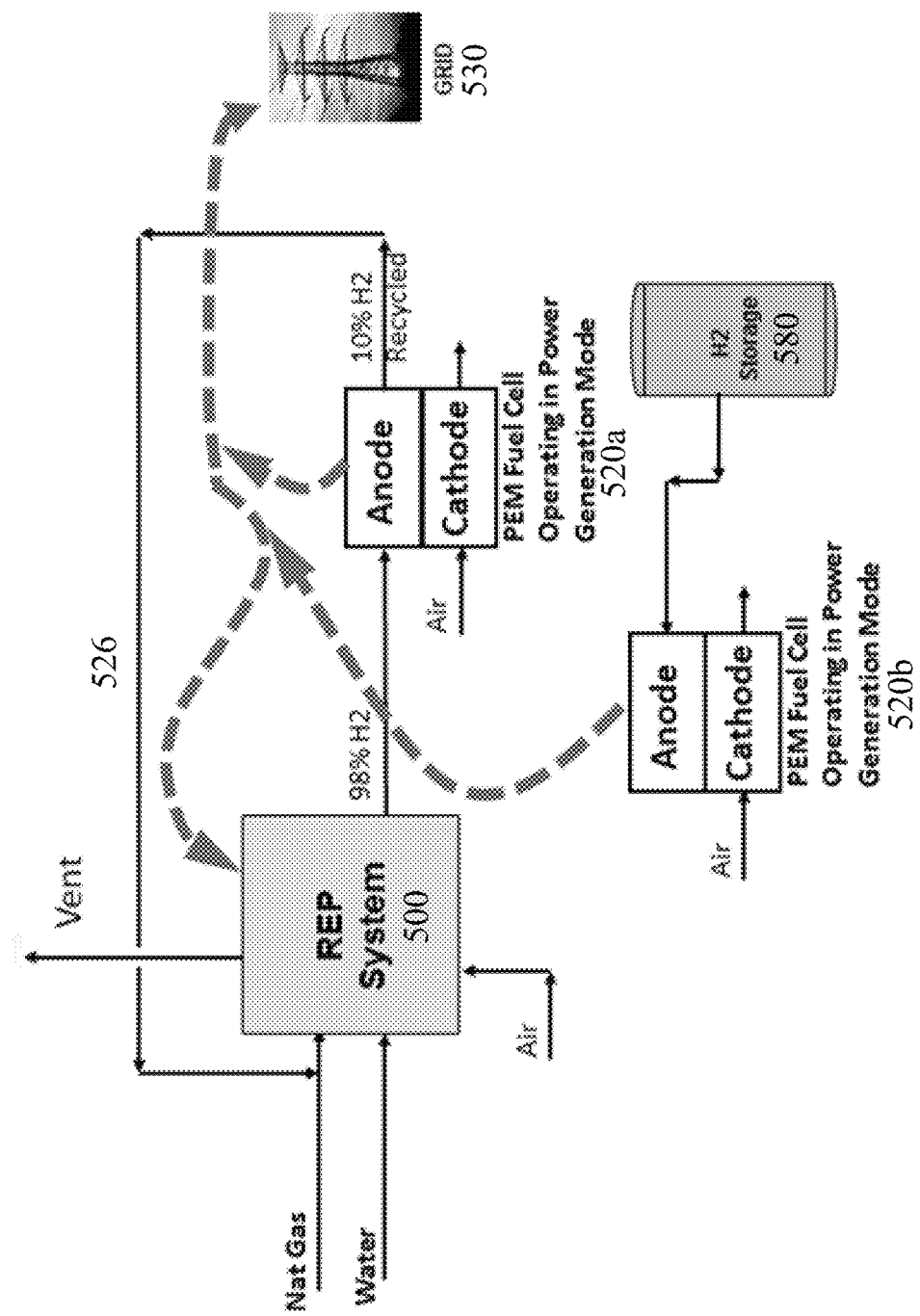
FIG. 7 illustrates operation of the hydrogen generation system in Mode 2A—a peak power mode for load following power generation.

Mode 2A—Peak Power Mode for Load Following Power Generation Using a Reversible EHC FIG. 7 illustrates operation of the system of FIG. 5 in Mode 2A—a peak power mode for load following power generation. In Mode 2A, power is still used to operate the REP assembly 500. Natural gas and water and power are fed into the REP assembly 500, which generates hydrogen (approximately 95 to 98% purity) and feeds the hydrogen to the first reversible PEM fuel cell 520*a*. During operation of the first PEM fuel cell 520*a* in the power generation mode, the first PEM fuel cell 520*a* is configured to output generated electrical power to a power supply, the REP assembly 500, or a combination thereof. For example, the first PEM fuel cell 520*a* may be operated in a power generation mode to produce power for the REP assembly 500 and to output power to the power grid 530. In some examples, approximately 30% of the power from the PEM is supplied to the REP assembly and approximately 70% is supplied to the grid. Hydrogen from the hydrogen storage 580 is conveyed to the second PEM power generation system or PEM fuel cell 520*b*, which is also operated in a power generation mode to produce power output to a power supply, the REP assembly 500, or a combination thereof. In some examples, all of the power produced by the second PEM fuel-cell 520*b* goes to the grid and the output is adjusted to meet the grid demand (load follow).

Mode 2B—Peak Power Mode for Load Following Power Using an Expander (with $CO_2$ Co-Generation)

Figure 8:
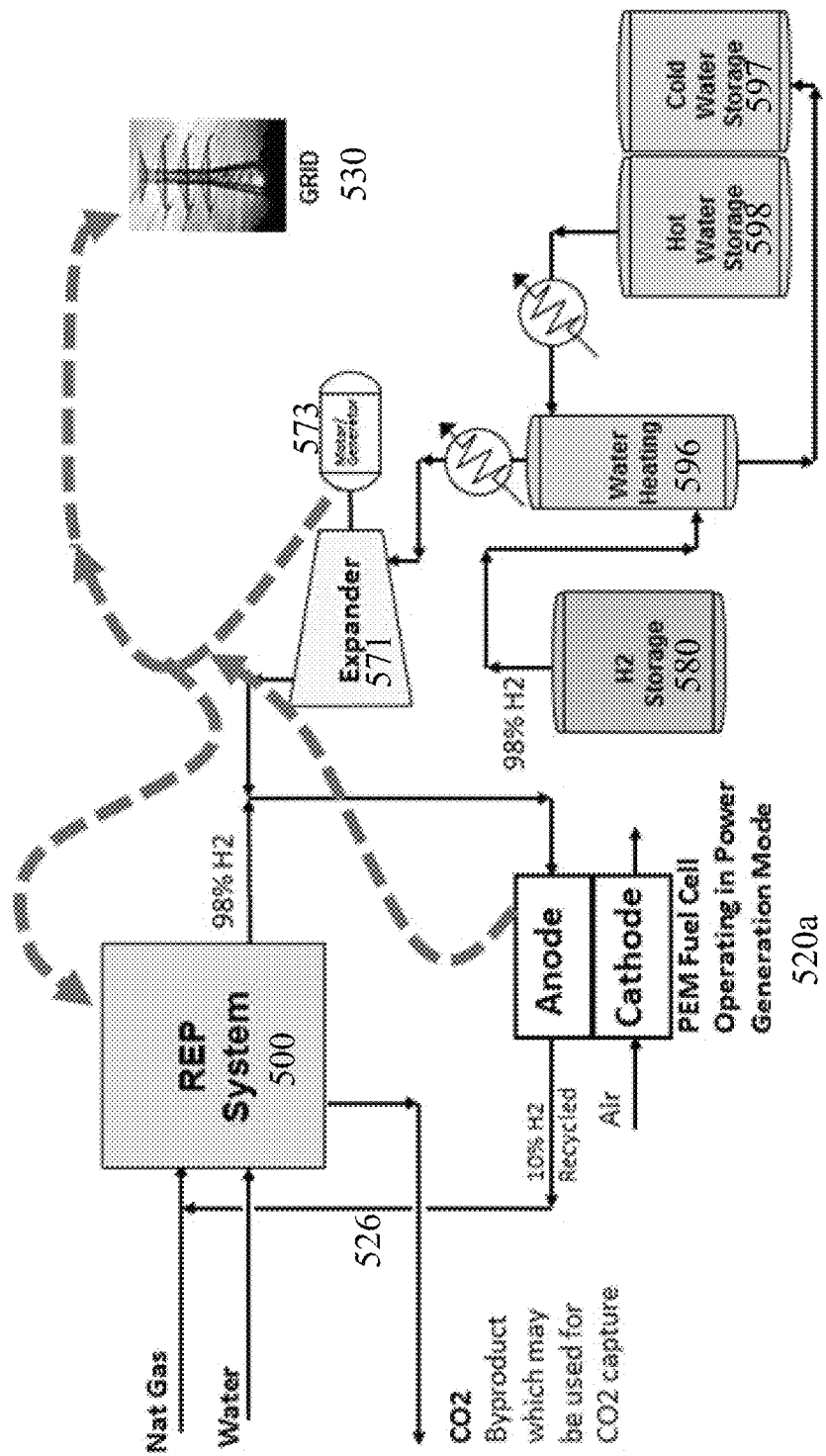
FIG. 8 illustrates operation of the hydrogen generation system in Mode 2B—a peak power mode for load following power using an expander (and with $CO_2/O_2$ cogeneration).

FIG. 8 illustrates operation of the system in Mode 2B—a peak power mode for load following power. In this example, CO2 generation/capture, such as shown in FIG. 4D, is also incorporated to produce zero $CO_2$ power. In Mode 2B, hydrogen from the hydrogen storage 580 is conveyed to the heat exchanger 596, which is also receiving water output from the hot water storage 598. The hot water may be used to humidify and heat the hydrogen prior to the expander in order to increase the expander power generation. Waste heat from the REP system could also be used to heat the hydrogen. After heat exchange occurs, the pressurized hydrogen output from the heat exchanger 596 is conveyed to a hydrogen expander 571 configured to expand the pressurized hydrogen to recover some of the energy used for compressing the hydrogen for storage in the storage assembly 580 in Mode 1A, and water output from the heat exchanger 596 is conveyed to the cold water storage 597. The hydrogen expander 571 drives a generator/motor 573. The expanded hydrogen at low pressure, typically 3 to 15 psig, is conveyed from the hydrogen expander 571 to the first PEM power generation system or PEM fuel cell 520*a*, which is operating in power generation mode. Power from the expander in the PEM fuel-cell is used to operate the REP assembly 500. Natural gas, water, and power are fed into the REP assembly 500, which generates hydrogen (approximately 95 to 98% purity) and feeds the hydrogen to the PEM power generation system or PEM fuel cell 520*a*. During operation of the PEM power generation system or PEM fuel cell 520*a* in the power generation mode, the PEM power generation system or PEM fuel cell 520*a* is configured to output generated electrical power to a power supply, the REP assembly 500, or a combination thereof. For example, the PEM power generation system or PEM fuel cell 520*a* may be operated in a power generation mode to produce power for the REP assembly 500 and to output power to the power grid 530. The net power produced by the first PEM power generation system or PEM fuel cell 520*a* after the REP assembly 500 power usage is output to the power grid 530. The oxidant gas comprising the $CO_2/O_2$ mixture output from the REP assembly 500 is used for $CO_2$ capture and/or $O_2$ output, as described, for example in Mode 1B.

Modes 1B and 2B differ from Modes 1A and 2A in that the oxidant gas comprising the $CO_2/O_2$ mixture output from the REP assembly 500 is used for $CO_2$ capture and/or $O_2$ output. The REP assembly can be used with a reformer for efficiently capturing $CO_2$ output from the REP assembly 500. For example, as discussed above with respect to FIG. 4C, the $CO_2/O_2$ mixture output from the REP assembly 500 may be used to oxidize fuel needed to generate the high level heat in a heater for a reforming reaction in a reformer. The heater may output a flue gas exhaust which comprises mainly $CO_2$ and water with a small amount of unreacted oxygen and which can be processed for $CO_2$ capture. Specifically, the flue gas exhaust from the heater is cooled so as to condense the water out and the resulting gas is almost pure $CO_2$ which can be easily captured for storage or other uses. For example, $CO_2$ output from the REP assembly can be used in a device that receives oxidant gas, such as an anode gas oxidizer (AGO). Also, Modes 1B and 2B includes a compressor/expander for hydrogen storage rather than a reversible electrochemical hydrogen compressor (EHC), which is used for compression and purification in Mode 1A and power generation in Mode 1B.

By using the Modes 1A-2B described above, it is possible to minimize the cost of energy storage and peak power generation. As seen in FIGS. 5-8, most of the equipment in the system is operating all of the time (during power generation and power storage), and peak power is generated efficiently. Although the second PEM power generation system or PEM fuel cell is idle during the power storage mode, a PEM cell has a relatively low capital cost such that idling the PEM cell has a relatively low impact on total power generation cost. The systems describe above how a power generation efficiency of approximately 40%, which is an improvement of typically 20 to 30% efficiency for a load following power system. The 40% power generation efficiency is the overall's system efficiency of power from natural gas. With this system, the only losses for power storage are from the compression power (in the EHC or compressor) which will vary with the storage pressure. In addition, the power fed to the REP assembly is used to generate hydrogen, as well as to purify the natural gas such that in the power storage mode, much of the power is converted to hydrogen for storage.

In addition to, or as an alternative to, the operating modes described above, in some examples, a lower cost feedstock with a higher carbon content and/or CO2 may be used during power storage mode if the value of the power being stored is close to zero or negative. At this power price, the hydrogen generated by electrolysis in the REP would be cheaper than the $H_2$ from natural gas.

The construction and arrangements of the REP assembly and systems incorporating the REP assembly, as shown in the various exemplary embodiments, are illustrative only. Although only a few embodiments have been described in detail in this disclosure, many modifications and combinations are possible (e.g., variations in sizes, dimensions, structures, shapes and proportions of the various elements, values of parameters, mounting arrangements, use of materials, colors, orientations, image processing and segmentation algorithms, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Any of the systems described above may also include a display or output device, an input device such as a keyboard, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the embodiments could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

What is claimed:

1. A hydrogen generation system for generating hydrogen and electrical power, the hydrogen generation system comprising:
   a power supply;
   a reformer-electrolyzer-purifier (REP) assembly comprising at least one fuel cell including an anode and a cathode separated by an electrolyte matrix, the at least one fuel cell configured to receive a reverse voltage supplied by the power supply and generate hydrogen-containing gas in the anode of the at least one fuel cell;
   a compressor;
   a hot water storage configured to receive, store, and output water having a first temperature;
   a cold water storage configured to receive, store, and output water having a second temperature lower than the first temperature;
   a heat exchanger; and
   a hydrogen storage, wherein:
   the hydrogen generation system is configured to selectably operate in a power storage mode, in which the hydrogen-containing gas is pressurized and stored in the hydrogen storage, and a power generation mode, in which the hydrogen-containing gas is used to generate electrical power, during operation of the hydrogen generation in the power storage mode:
the compressor is configured to receive and compress the hydrogen-containing gas output from the REP assembly to be received in the hydrogen storage,
the cold water storage is configured to output water to an inlet of the heat exchanger, and
the heat exchanger is configured to output water to the hot water storage,
during operation of the power generation system in the power generation mode:
the heat exchanger is configured to receive water from the hot water storage and the hydrogen-containing gas from the hydrogen storage and perform a heat exchange to pre-heat and humidify the hydrogen-containing gas.

2. The hydrogen generation system of claim 1, wherein the hydrogen storage is configured to store at least a portion of the hydrogen-containing gas generated by the at least one fuel cell of the REP assembly.

3. The hydrogen generation system of claim 1, wherein the power supply is configured to apply the reverse voltage so that the hydrogen-containing gas output from the REP assembly comprises 95% or greater hydrogen.

4. The hydrogen generation system of claim 1, wherein:
the REP assembly is configured to selectably operate in a hydrogen generation mode and a power generation mode; and
the REP assembly further comprises a controller programmed to:
control the power supply to apply the reverse voltage to the at least one fuel cell when the REP assembly operates in the hydrogen producing mode such that the at least one fuel cell generates the hydrogen-containing gas, and
control the power supply not to apply the reverse voltage to the at least one fuel cell when the REP assembly operates in the power producing mode such that the at least one fuel cell generates electrical power from fuel.

5. The hydrogen generation system of claim 4, wherein the at least one fuel cell of the REP assembly is configured to output the generated electrical power to the power supply.

6. The hydrogen generation system of claim 1, wherein, when the power supply applies the reverse voltage to the at least one fuel cell, the at least one fuel cell is configured such that carbon dioxide is separated from the hydrogen-containing gas using an electrolysis reaction in the anode of the at least one fuel cell such that the at least one fuel cell outputs the hydrogen-containing gas and separately outputs an oxidant gas comprising carbon dioxide and oxygen.

7. The hydrogen generation system of claim 1, further comprising:
one or more reformers configured to reform hydrocarbon fuel and output reformed fuel to the at least one fuel cell as a gas feed,
wherein the at least one fuel cell is further configured to perform one or more of:
reacting methane with water to produce hydrogen and carbon dioxide; and
shifting carbon monoxide with water to produce hydrogen and carbon dioxide.

8. The hydrogen generation system of claim 1, wherein the heat exchanger is configured to receive, and to at least partially cool, the compressed hydrogen-containing gas output from the compressor; and the hydrogen storage is configured to receive cooled, compressed hydrogen-containing gas output from the heat exchanger.

9. The hydrogen generation system of claim 8, further comprising a methanation reactor configured to receive the hydrogen-containing gas generated by the at least one fuel cell of the REP assembly after the hydrogen-containing gas has been partially cooled, wherein the methanation reactor is configured to convert traces of carbon monoxide in the hydrogen-containing gas to methane.

10. The hydrogen generation system of claim 1, further comprising:
an expander,
wherein, during operation of the power generation system in the power generation mode, the expander is configured to receive the hydrogen-containing gas output from the heat exchanger and expand the hydrogen-containing gas to recover at least a portion of energy used to compress the hydrogen-containing gas for storage in the hydrogen storage.

11. The hydrogen generation system of claim 10, further comprising:
at least one low temperature fuel cell configured to receive the hydrogen-containing gas output from the expander and the hydrogen-containing gas output from the REP assembly, and to generate electrical power.

12. The hydrogen generation system of claim 11, wherein the at least one low temperature fuel cell is configured to selectably operate in a power generation mode in which the hydrogen-containing gas is used to generate electrical power, and a power storage mode in which the hydrogen-containing gas is pressurized and stored in the hydrogen storage.

13. The hydrogen generation system of claim 12, further comprising:
a second low temperature fuel cell, wherein:
the hydrogen storage contains at least a pre-stored amount of the hydrogen-containing gas; and
during operation of the at least one low temperature fuel cell in the power generation mode, the second low temperature fuel cell is configured to receive the hydrogen-containing gas from the hydrogen storage and to output the generate electrical power to the power supply.

14. The hydrogen generation system of claim 11, wherein, during operation of the at least one low temperature fuel cell in the power generation mode, the at least one low temperature fuel cell is configured to output the generated electrical power to the power supply, the REP assembly, or a combination thereof.

15. The hydrogen generation system of claim 11, wherein:
the at least one fuel cell of the REP assembly comprises a molten carbonate fuel cell; and
the at least one low temperature fuel cell comprises a proton exchange membrane fuel cell.

16. The hydrogen generation system of claim 1, further comprising:
an expander,
wherein, during operation of the power generation system in the power generation mode:
the expander is configured to receive the heated and humidified hydrogen-containing gas output from the heat exchanger and expand the hydrogen-containing gas to recover at least a portion of energy used to compress the hydrogen-containing gas for storage in the hydrogen storage.

* * * * *